UNITED STATES PATENT OFFICE.

TRAUGOTT SANDMEYER, OF BASLE, SWITZERLAND, ASSIGNOR TO JOHN R. GEIGY & CO., OF SAME PLACE.

BLUE DYE.

SPECIFICATION forming part of Letters Patent No. 538,027, dated April 23, 1895.

Application filed August 17, 1894. Serial No. 520,592. (Specimens.)

*To all whom it may concern:*

Be it known that I, TRAUGOTT SANDMEYER, doctor of philosophy, a citizen of the Republic of Switzerland, residing at Basle, Switzerland, have invented certain new and useful Improvements in the Manufacture of Blue Coloring-Matter, of which the following is a specification.

The invention relates to the manufacture of a blue coloring matter and consists in the substitution of the amidogroup by hydrogen according to the reaction of Griess in the product obtained by condensation of tetramethyldiamidobenzhydrol with the sulfoacid of orthotoluidin ($NH_2$: $CH_3$: $SO_3H$ = 1:2:5) and in the oxidation of the thus obtained leukosulfoacid into the coloring matter.

As an example of the manner in which this blue coloring matter may be prepared, I proceed as follows: Fifteen kilograms tetramethyldiamidobenzhydrol and twelve kilograms of orthotoluidin sulfoacid ($NH_2$: $CH_3$: $SO_3H$ = 1:2:5) are boiled with ten kilograms of sulfuric acid and three hundred liters water, until a sample does not show any more the presence of hydrol. The product of condensation is precipitated by neutralization with soda-lye and acidulation with acetic acid, filtered, dissolved in twenty kilograms of sulfuric acid and one hundred liters water. To the cold solution are added one hundred liters of alcohol and six kilograms of sodium nitrite dissolved in twenty liters water. A small quantity of cuprous oxid ($Cu_2O$) accelerates very much the transformation of the diazocompound. The solution is now diluted with water up to four thousand liters, mixed with sodium acetate, until it does not contain any more mineral acid and oxidized by addition of the necessary quantity of peroxid of lead ($PbO_2$). When the oxidation has been accomplished, the solution is neutralized with sodium carbonate, filtered with the coloring matter from the sulphate of lead and evaporated after it has been slightly acidulated again, until the coloring matter begins to separate completely. It forms a bronze-like powder which dissolves in water with a blue shade. Wool and silk are dyed in a slightly acidulated bath. If the bronze-like powder is again dissolved in slightly alkaline water (ammonia or carbonate of soda), the coloring matter separates after some time in green crystals, which I consider to be the anhydrid of the monosulfoacid of tetramethyldiamido diphenyltolylcarbinol, and which has the following constitutional formula:

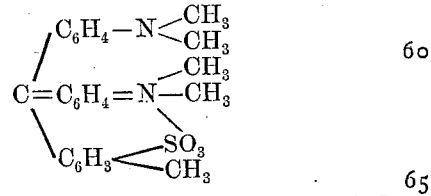

The crystals are soluble in water, alcohol and chloroform with a fine blue, in concentrated sulfuric acid with a yellowish brown color turning to green by dilution with water. By addition of soda-lye or acetic acid the solution does not change its color, but mineral acids make it turn from blue to green and yellow. The crystals are insoluble in ether and benzene.

A most prominent characteristic of the new dyestuff is that it separates from diluted solutions in beautiful crystals showing an uncommonly fine dichroism. Thus that of two opposite faces of a crystal one face shows a steel-blue and the other a brass-like luster.

What I claim as my invention, and desire to secure by Letters Patent, is—

1. The process herein described of making a blue dyestuff or coloring matter, which consists in the condensation of tetramethyldiamidobenzhydrol with orthotoluidin sulfoacid ($NH_2$: $CH_3$: $SO_3H$ = 1:2:5), so as to substitute the amidogroup by hydrogen and oxidizing the thus obtained leukosulfoacid, substantially as set forth.

2. A new product, the blue dyestuff or coloring matter herein described, being the anhydrid of the monosulfoacid of tetramethyldiamido diphenyltolylcarbinol, being a greenish crystalline powder, soluble in water, alcohol and chloroform with a fine blue, in concentrated sulfuric acid with a yellowish brown color turning to green by dilution with water, not changing its color by addition of soda-lye or acetic acid, and separating from diluted solutions in beautiful crystals showing an uncommonly fine dichroism, substantially as described.

In testimony that I claim the foregoing as my invention I have signed my name in presence of two subscribing witnesses.

TRAUGOTT SANDMEYER.

Witnesses:
GEORGE GIFFORD,
C. A. BURCKHARDT.